(12) United States Patent
Ducher

(10) Patent No.: US 11,548,353 B2
(45) Date of Patent: Jan. 10, 2023

(54) BATTERY POWERED TRANSPORTATION REFRIGERATION UNIT WITH VARIABLE INVERTER

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 202 days.

(21) Appl. No.: 16/899,051

(22) Filed: Jun. 11, 2020

(65) Prior Publication Data

US 2020/0391574 A1    Dec. 17, 2020

(30) Foreign Application Priority Data

Jun. 13, 2019 (EP) .................................. 19305759

(51) Int. Cl.
*B60H 1/32* (2006.01)
*H02J 7/00* (2006.01)

(52) U.S. Cl.
CPC ......... *B60H 1/3211* (2013.01); *B60H 1/3226* (2013.01); *H02J 7/0063* (2013.01); *H02J 2207/20* (2020.01)

(58) Field of Classification Search
CPC .................. B60H 1/00428; B60H 1/3211; B60H 1/3226; H02J 7/0063; H02J 2207/20; F25D 11/003
See application file for complete search history.

(56) References Cited

U.S. PATENT DOCUMENTS

| 8,860,243 | B2* | 10/2014 | Hering | ..................... B60L 1/00 307/9.1 |
|---|---|---|---|---|
| 2017/0349078 | A1 | 12/2017 | Dziuba et al. | |
| 2020/0198519 | A1* | 6/2020 | Liao | ........................ B60H 1/00 |
| 2021/0268908 | A1* | 9/2021 | Liao | ....................... B60L 1/003 |

FOREIGN PATENT DOCUMENTS

| WO | 2018204591 A1 | 11/2018 |
|---|---|---|
| WO | 2018226389 A1 | 12/2018 |

OTHER PUBLICATIONS

The Extended European Search Report for Application No. 19305759. 3-1009; Report dated Nov. 20, 2019; Report dated Nov. 29, 2019; 11 pages.

* cited by examiner

*Primary Examiner* — Marc E Norman
(74) *Attorney, Agent, or Firm* — Cantor Colburn LLP

(57) ABSTRACT

A transport refrigeration system including: a transportation refrigeration unit configured to provide conditioned air to a refrigerated cargo space; an energy storage device configured to store DC electrical energy to power the transportation refrigeration unit; and a DC-to-AC variable invertor electrically connecting the energy storage device to the transportation refrigeration unit, the DC-to-AC variable invertor being configured to convert the DC electrical energy from the energy storage device to AC electrical energy in a variable continuous energy output to power the transportation refrigeration unit.

20 Claims, 3 Drawing Sheets

BATTERY POWERED TRANSPORTATION REFRIGERATION UNIT WITH VARIABLE INVERTER

CROSS-REFERENCE TO RELATED APPLICATIONS

This application claims the benefit of EP Application No. 19305759.3 filed Jun. 13, 2019, the disclosure of which is incorporated herein by reference in its entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an alternating (AC) synchronous generator that generates AC power. The generated AC power is used to power an electric motor for driving the refrigerant compressor of the transportation refrigeration unit and also powering electric AC fan motors for driving the condenser and evaporator motors and electric heaters associated with the evaporator. A more efficient method to power the electric motor is desired to reduce fuel usage.

BRIEF DESCRIPTION

According to one embodiment, a transport refrigeration system is provided. The transport refrigeration system including: a transportation refrigeration unit configured to provide conditioned air to a refrigerated cargo space; an energy storage device configured to store DC electrical energy to power the transportation refrigeration unit; and a DC-to-AC variable invertor electrically connecting the energy storage device to the transportation refrigeration unit, the DC-to-AC variable invertor being configured to convert the DC electrical energy from the energy storage device to AC electrical energy in a variable continuous energy output to power the transportation refrigeration unit.

In addition to one or more of the features described above, or as an alternative, further embodiments of the transport refrigeration system may include a power management module in electrical communication with the DC-to-AC variable invertor and the transportation refrigeration unit, wherein the power management module is configured to control the variable continuous energy output of the DC-to-AC variable invertor in response to transportation refrigeration unit parameters.

In addition to one or more of the features described above, or as an alternative, further embodiments of the transport refrigeration system may include that the power management module is in electrical communication with the energy storage device wherein the power management module is configured to adjust the variable continuous energy output of the DC-to-AC variable invertor in response to parameters of the energy storage device.

In addition to one or more of the features described above, or as an alternative, further embodiments of the transport refrigeration system may include that the DC-to-AC variable invertor is configured to provide the variable continuous energy output in a range between a first energy output and a second energy output.

In addition to one or more of the features described above, or as an alternative, further embodiments of the transport refrigeration system may include that the DC-to-AC variable invertor is configured to provide the variable continuous energy output in a first energy output and a second energy output.

In addition to one or more of the features described above, or as an alternative, further embodiments of the transport refrigeration system may include that the DC-to-AC variable invertor is incorporated in the energy storage device.

In addition to one or more of the features described above, or as an alternative, further embodiments of the transport refrigeration system may include that the DC-to-AC variable invertor is not incorporated in the energy storage device.

In addition to one or more of the features described above, or as an alternative, further embodiments of the transport refrigeration system may include that the energy storage device includes a battery system.

According to another embodiment, a method of operating a transport refrigeration system is provided. The method including: providing conditioned air to a refrigerated cargo space using a transportation refrigeration unit; storing DC electrical energy to power the transportation refrigeration unit using an energy storage device; and converting the DC electrical energy from the energy storage device to AC electrical energy in a variable continuous energy output to power the transportation refrigeration unit using a DC-to-AC variable invertor.

In addition to one or more of the features described above, or as an alternative, further embodiments of the transport refrigeration system may include: controlling the variable continuous energy output of the DC-to-AC variable invertor in response to transportation refrigeration unit parameters using a power management module.

In addition to one or more of the features described above, or as an alternative, further embodiments of the transport refrigeration system may include: adjusting the variable continuous energy output of the DC-to-AC variable invertor in response to parameters of the energy storage device using the power management module.

In addition to one or more of the features described above, or as an alternative, further embodiments of the transport refrigeration system may include that the DC-to-AC variable invertor is configured to provide the variable continuous energy output in a range between a first energy output and a second energy output.

In addition to one or more of the features described above, or as an alternative, further embodiments of the transport refrigeration system may include that the DC-to-AC variable invertor is configured to provide the variable continuous energy output in a first energy output and a second energy output.

In addition to one or more of the features described above, or as an alternative, further embodiments of the transport refrigeration system may include that the DC-to-AC variable invertor is incorporated in the energy storage device.

In addition to one or more of the features described above, or as an alternative, further embodiments of the transport refrigeration system may include that the DC-to-AC variable invertor is not incorporated in the energy storage device.

In addition to one or more of the features described above, or as an alternative, further embodiments of the transport refrigeration system may include that the energy storage device includes a battery system.

According to another embodiment, a computer program product embodied on a non-transitory computer readable medium is provided. The computer program product including instructions that, when executed by a processor, cause the processor to perform operations including: providing conditioned air to a refrigerated cargo space using a transportation refrigeration unit; storing DC electrical energy to power the transportation refrigeration unit using an energy storage device; and converting the DC electrical energy from the energy storage device to AC electrical energy in a variable continuous energy output to power the transportation refrigeration unit using a DC-to-AC variable invertor.

In addition to one or more of the features described above, or as an alternative, further embodiments of the transport refrigeration system may include that the operations further include: controlling the variable continuous energy output of the DC-to-AC variable invertor in response to transportation refrigeration unit parameters using a power management module.

In addition to one or more of the features described above, or as an alternative, further embodiments of the transport refrigeration system may include that the operations further include: adjusting the variable continuous energy output of the DC-to-AC variable invertor in response to parameters of the energy storage device using the power management module.

In addition to one or more of the features described above, or as an alternative, further embodiments of the transport refrigeration system may include that the DC-to-AC variable invertor is configured to provide the variable continuous energy output in a range between a first energy output and a second energy output.

Technical effects of embodiments of the present disclosure include converting electrical energy from an energy storage device to a variable continuous energy output to power the transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
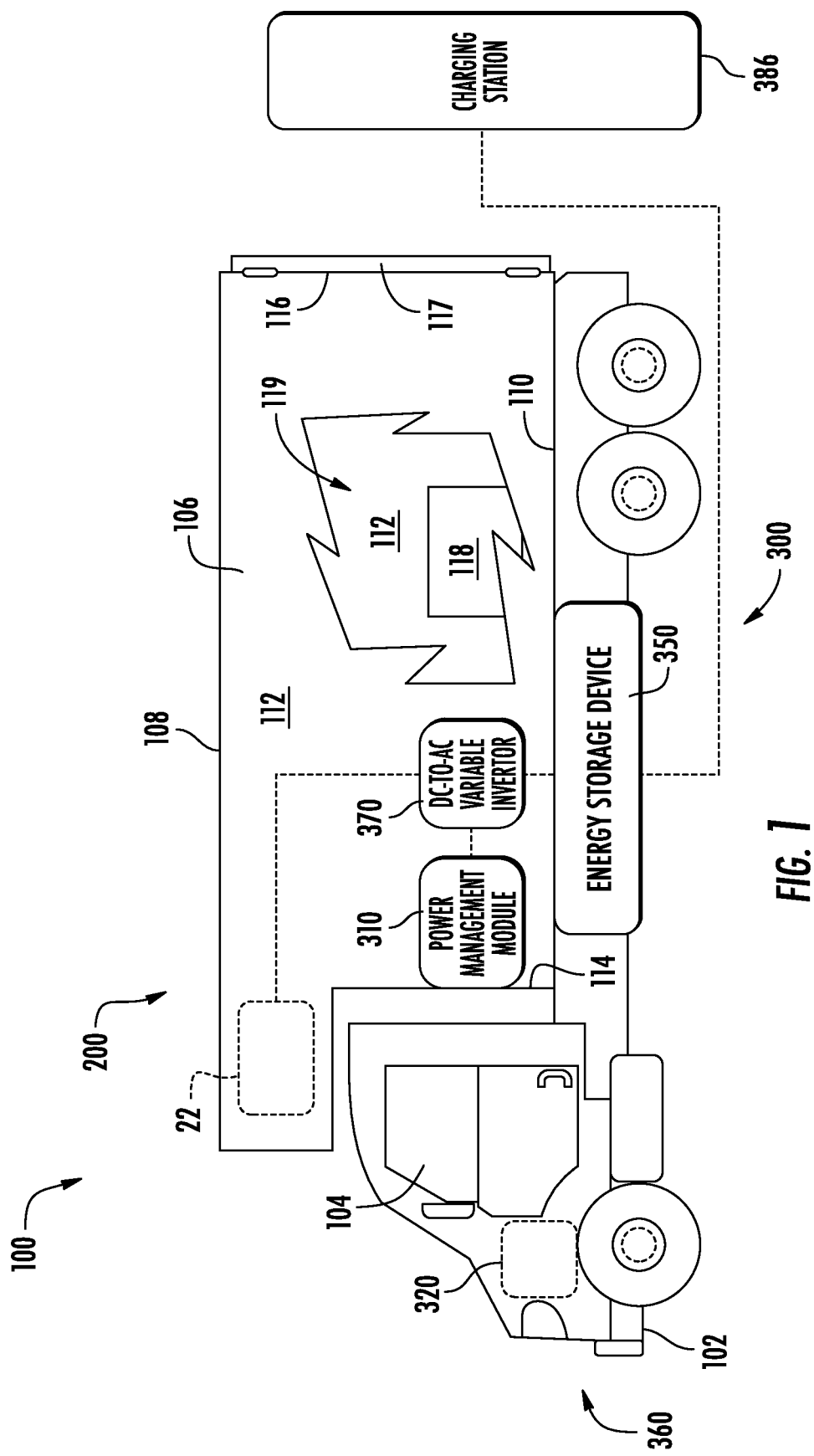
FIG. 1 is a schematic illustration of a transport refrigeration system, according to an embodiment of the present disclosure.
Figure 2:
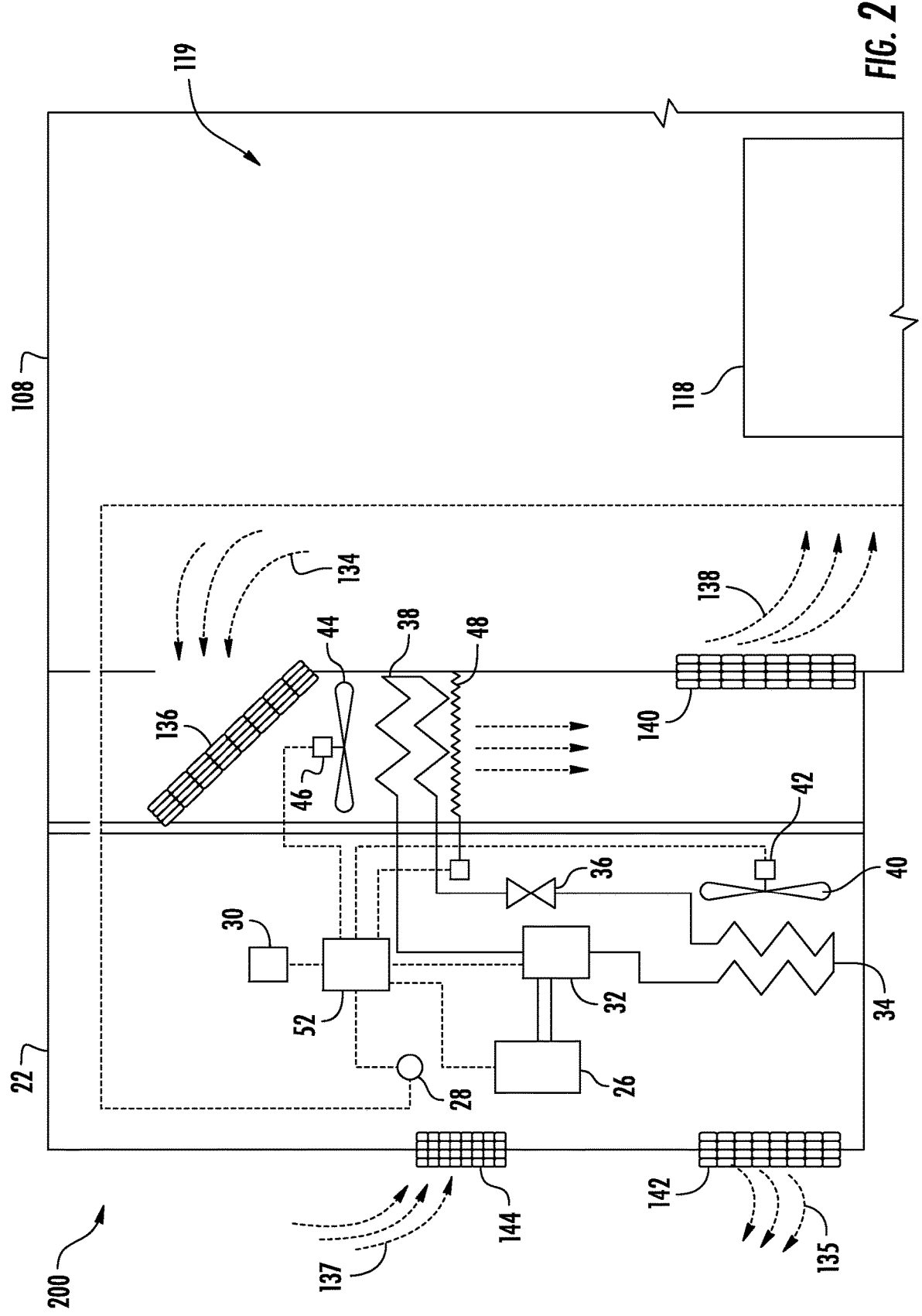
FIG. 2 is an enlarged schematic illustration of a transportation refrigeration unit of the transport refrigeration system of FIG. 1, according to an embodiment of the present disclosure.

Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a truck or trailer system 100, as seen in FIG. 1. The trailer system 100 includes a vehicle 102 integrally connected to a transport container 106. The vehicle 102 includes an operator's compartment or cab 104 and a propulsion motor 320 which acts as the drive system of the truck or trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be a combustion engine, an electric motor, or a hybrid motor (e.g., a combination of a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. The refrigerated cargo space 119 may be subdivided into multiple different compartments that each have a different controlled environment (e.g., different temperature). It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, a refrigerant compression device 32, an electric motor 26 for driving the refrigerant compression device 32, and a controller 30. The transportation refrigeration unit 22 is in operative association with the refrigerated cargo space 112 and is configured to provide conditioned air to the transport container 106. The transportation refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transportation refrigeration unit 22 is capable of providing a desired temperature and humidity range.

The transportation refrigeration unit 22 includes a refrigerant compression device 32, a refrigerant heat rejection heat exchanger 34 (e.g., condenser), an expansion device 36, and a refrigerant heat absorption heat exchanger 38 (e.g., evaporator) connected in refrigerant flow communication in a closed loop refrigerant circuit and arranged in a conventional refrigeration cycle. The transportation refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transportation refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit. It is also to be understood that additional refrigeration circuits may be run in parallel and powered by the energy storage device 350 as desired.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transportation refrigeration unit 22 is operating in a subcritical refrigerant cycle or as a refrigerant gas cooler, such as if the transportation refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transportation refrigeration unit 22. A return airflow 134 flows into the transportation refrigeration unit 22 from the refrigerated cargo space 119 through the return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transportation refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transportation refrigeration unit 22 can further be operated in reverse to warm the container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transportation refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The transportation refrigeration unit 22 is powered by the energy storage device 350, which provides electrical energy to the transportation refrigeration unit 22 and will be discussed further below. Examples of the energy storage device 350 may include a battery system (e.g., a battery or bank of batteries), fuel cells, flow battery, and others devices capable of storing and outputting electric energy that may be direct current (DC). The energy storage device 350 may include a battery system, which may employ multiple batteries organized into battery banks. In one embodiment, the energy storage device 350 may provide electrical energy to the transportation refrigeration unit 22 and the propulsion motor 320 of the vehicle 102. In another embodiment, the energy storage device 350 may provide electrical energy solely to the transportation refrigeration unit 22, while the propulsion motor 320 of the vehicle 102 receives electrical energy from another source.

The energy storage device 350 may be charged by a stationary charging station 386 such as, for example a wall 48V power outlet. The charging station 386 may provide single phase (e.g., level 2 charging capability) or three phase alternating current (AC) energy to the energy storage device 350. It is understood that the charging station 386 may have any phase charging and embodiments disclosed herein are not limited to single phase or three phase AC power. In an embodiment, the single phase AC power may be a high voltage DC power, such as, for example, between 48 to 900 VDC.

In one embodiment, the energy storage device 350 is located outside of the transportation refrigeration unit 22, as shown in FIG. 1. In another embodiment, the energy storage device 350 is located within the transportation refrigeration unit 22. The transportation refrigeration unit 22 has a plurality of electrical power demand loads on the energy storage device 350, including, but not limited to, the electric motor 26 for the refrigerant compression device 32, the fan motor 42 for the fan 40 associated with the refrigerant heat rejection heat exchanger 34, and the fan motor 46 for the fan 44 associated with the refrigerant heat absorption heat exchanger 38. It is to be understood that, while not required, various power converters 52, such as, for example, AC to DC rectifiers, DC to AC inverters, AC to AC voltage/frequency converters, and DC to DC voltage converters, may be employed in connection with the energy storage device 150 as appropriate. In an embodiment, each of the fan motors 42, 46 and the electric motor 26 may be an AC motor and are thus electrically connected to the energy storage device 350 through a DC-to-AC variable invertor 370 that is configured to convert the DC electrical energy from the energy storage device to AC electrical energy in a variable continuous energy output to power the transportation refrigeration unit 22. The DC-to-AC variable invertor 370 electrically connects the energy storage device 350 to the transportation refrigeration unit 22.

The DC-to-AC variable invertor 370 is configured to provide the variable continuous energy output to the transportation refrigeration unit 22 or specifically to the electric motor 26 of the transportation refrigeration unit 22. The DC-to-AC variable invertor 370 is configured to provide the variable continuous energy output in a range between the first energy output and the second energy output. It is understood that the values the first energy output is not limited to 35 Hz and the second energy output is not limited to 65 Hz and the first energy output and the second energy output may vary in value based upon various factors, including, but not limited to, voltage of the various components of the transportation refrigeration unit 22, frequency acceptance of the various components of the transportation refrigeration unit 22, and characteristics of the various components of the transportation refrigeration unit 22.

A power management module 310 may be configured to control and/or adjust the variable continuous energy output of the DC-to-AC variable invertor 370 in response to transportation refrigeration unit parameters of the transportation refrigeration unit 22. The transportation refrigeration unit parameters may include but are not limited to set point, ambient temperature, delta T° between the temperature in the refrigerated cargo space 119 and the temperature set point of the transportation refrigeration unit 22, airflow rate into or out of the container 106, cooling capacity, temperature homogeneity in the container 106, doors 117 opening situation . . . etc. Transportation refrigeration unit parameters, such as delta T° may be important because a high delta T° may indicate that an increase energy is required for pull down or pull up. The power management module 310 is in electrical communication with the transportation refrigeration unit 22 and the DC-to-AC variable invertor 370. The power management module 310 may also be in electrical communication with the energy storage device 350. The power management module 310 may be configured to control and/or adjust energy output of the DC-to-AC variable invertor 370 in response to parameters of the energy storage device 350, including, but not limited to, a state of charge of the energy storage device 350 a state of health of the energy storage device 350, and a temperature of the energy storage device 350.

Advantageously by controlling energy output of the DC-to-AC variable invertor 370 in response to parameters of the transportation refrigeration unit 22 the efficiency of the transportation refrigeration unit 22 may be improved and the energy consumption of the energy storage device 350 may be reduced or limited.

In the depicted embodiment, the heater 48 also constitutes an electrical power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136. Additionally, the electric motor 26 being used to power the refrigerant compression device 32 also constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage from the energy storage device 350.

As described above the energy storage device 350 is used to store electrical energy that is used to electrically power the transportation refrigeration unit 22. The energy storage device 350 is integrated within an energy management system 300. The energy management system 300 comprises the energy storage device 350 configured to provide electrical power to the transportation refrigeration unit, the electric motor 26 configured to power the transportation refrigeration unit 22, a power management module 310, and the DC-to-AC variable invertor 370.

It should be appreciated that, although particular components of the energy management system 300 are separately defined in the schematic block diagram of FIGS. 1 and 2, each or any of the components may be otherwise combined or separated via hardware and/or software. In one example, while the power management module 310 is illustrated in FIG. 1 as being separate from the transportation refrigeration unit 22, in various embodiments, the power management module 310 may be incorporated into the transportation refrigeration unit 22 and/or the controller 30 of the transportation refrigeration unit 22. In an embodiment, the power management module 310 may be a computer program product (e.g., software) encoded within controller 30. In another example, while the DC-to-AC variable invertor 370 is illustrated in FIG. 1 as being separate from the energy storage device 350 and the transportation refrigeration unit, in various embodiments, the DC-to-AC variable invertor 370 may be incorporated in the energy storage device 350 or the transportation refrigeration unit 22. In one embodiment, the DC-to-AC variable invertor is incorporated in the energy storage device 350. In another embodiment, the DC-to-AC variable invertor 370 is separate from the energy storage device 350 (i.e., not incorporated in the energy storage device 350).

The power management module 310 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Figure 3:
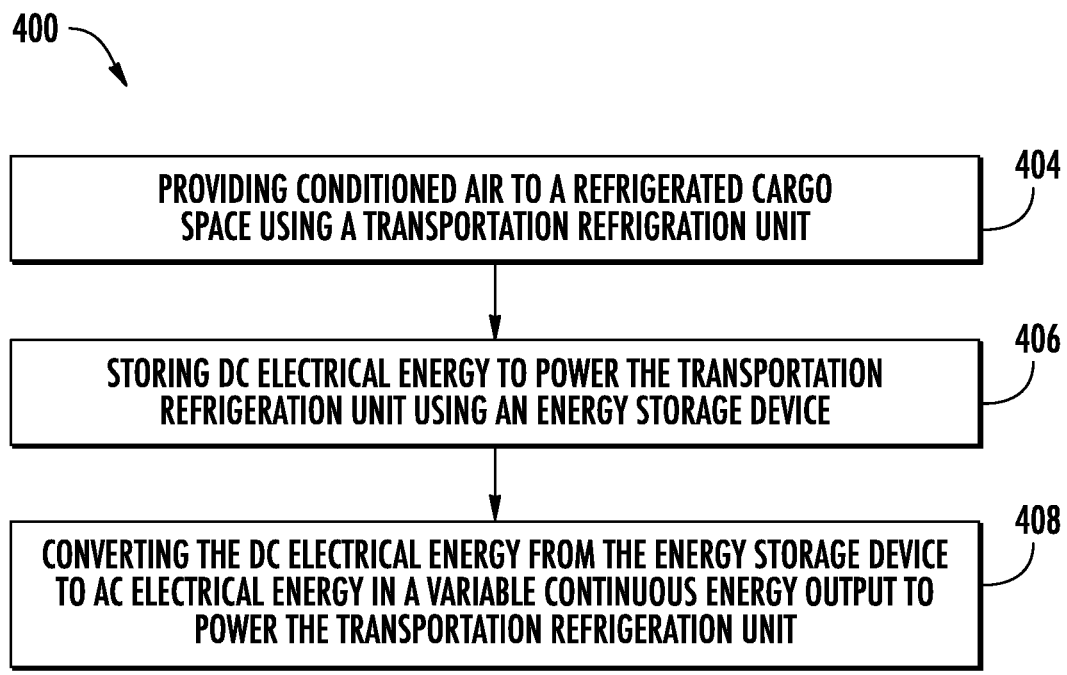
FIG. 3 is a flow process illustrating a method of operating the transport refrigeration system of FIGS. 1 and 2, according to an embodiment of the present disclosure.

Referring now to FIG. 3, with continued reference to FIGS. 1 and 2. FIG. 3 shows a flow process illustrating a method 400 of operating a transport refrigeration system 200, according to an embodiment of the present disclosure. At block 404, conditioned air is provided to a refrigerated cargo space 119 using a transportation refrigeration unit 22. At block 406, DC electrical energy to power the transportation refrigeration unit 22 is stored using an energy storage device 350. At block 408, the DC electrical energy from the energy storage device 350 is converted to AC electrical energy in a variable continuous energy output to power the transportation refrigeration unit 22. The DC-to-AC variable invertor 370 electrically connecting the energy storage device 350 to the transportation refrigeration unit 22.

The method 400 may also comprise that the variable continuous energy output of the DC-to-AC variable invertor 370 is controlled in response to transportation refrigeration unit parameters using a power management module 310. The method 400 may also comprise that the variable continuous energy output of the DC-to-AC variable invertor 370 is adjusted in response to parameters of the energy storage device 350 using the power management module 310.

In an embodiment, the DC-to-AC variable invertor 370 is configured to provide the variable continuous energy output in a range between a first energy output and a second energy output. In another embodiment, the DC-to-AC variable invertor 370 is configured to provide the variable continuous energy output in range between a first energy output and a second energy output. In another embodiment, the DC-to-AC variable invertor 370 is incorporated in the energy storage device 350. In another embodiment, the DC-to-AC variable invertor is not incorporated in the energy storage device. In another embodiment, the energy storage device 350 includes a battery system.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a transportation refrigeration unit that provides conditioned air to a refrigerated cargo space;
an energy storage device that stores DC electrical energy to power the transportation refrigeration unit;

a DC-to-AC variable invertor electrically connecting the energy storage device to the transportation refrigeration unit, wherein the DC-to-AC variable invertor converts the DC electrical energy from the energy storage device to AC electrical energy in a variable continuous energy output to power the transportation refrigeration unit.

2. The transport refrigeration system of claim 1, further comprising:
a power management module in electrical communication with the transportation refrigeration unit and the DC-to-AC variable inverter;
wherein the power management module controls the variable continuous energy output of the DC-to-AC variable invertor in response to transportation refrigeration unit parameters of the transportation refrigeration unit.

3. The transport refrigeration system of claim 2, wherein the power management module is in electrical communication with the energy storage device and adjusts the variable continuous energy output of the DC-to-AC variable invertor in response to energy storage device parameters of the energy storage device.

4. The transport refrigeration system of claim 1, wherein the power management module controls the DC-to-AC variable invertor to provide the variable continuous energy output in a range between a first energy output and a second energy output.

5. The transport refrigeration system of claim 1, wherein the DC-to-AC variable invertor provides the variable continuous energy output in a first energy output and a second energy output.

6. The transportation refrigeration system of claim 1, wherein the DC-to-AC variable invertor is incorporated in the energy storage device.

7. The transportation refrigeration system of claim 1, wherein the DC-to-AC variable invertor is not incorporated in the energy storage device.

8. The transportation refrigeration system of claim 1, wherein the energy storage device includes a battery system.

9. A method of operating a transport refrigeration system, the method comprising:
providing conditioned air to a refrigerated cargo space using a transportation refrigeration unit;
storing DC electrical energy to power the transportation refrigeration unit using an energy storage device; and
converting the DC electrical energy from the energy storage device to AC electrical energy in a variable continuous energy output to power the transportation refrigeration unit using a DC-to-AC variable invertor.

10. The method of claim 9, further comprising controlling the variable continuous energy output of the DC-to-AC variable invertor in response to transportation refrigeration unit parameters using a power management module.

11. The method of claim 10, further comprising adjusting the variable continuous energy output of the DC-to-AC variable invertor in response to parameters of the energy storage device using the power management module.

12. The method of claim 9, wherein the DC-to-AC variable invertor provides the variable continuous energy output in a range between a first energy output and a second energy output.

13. The method of claim 9, wherein the DC-to-AC variable invertor provides the variable continuous energy output in a first energy output and a second energy output.

14. The method of claim 9, wherein the DC-to-AC variable invertor is incorporated in the energy storage device.

15. The method of claim 9, wherein the DC-to-AC variable invertor is not incorporated in the energy storage device.

16. The method of claim 9, wherein the energy storage device includes a battery system.

17. A computer program product embodied on a non-transitory computer readable medium, the computer program product including instructions that, when executed by a processor, cause the processor to perform operations comprising:
providing conditioned air to a refrigerated cargo space using a transportation refrigeration unit;
storing DC electrical energy to power the transportation refrigeration unit using an energy storage device; and
converting the DC electrical energy from the energy storage device to AC electrical energy in a variable continuous energy output to power the transportation refrigeration unit using a DC-to-AC variable invertor.

18. The computer program product of claim 17, wherein the operations further comprise controlling the variable continuous energy output of the DC-to-AC variable invertor in response to transportation refrigeration unit parameters using a power management module.

19. The computer program product of claim 18, wherein the operations further comprise adjusting the variable continuous energy output of the DC-to-AC variable invertor in response to parameters of the energy storage device using the power management module.

20. The computer program product of claim 17, wherein the DC-to-AC variable invertor is configured to provide the variable continuous energy output in a range between a first energy output and a second energy output.

* * * * *